(12) United States Patent
Kirshnan et al.

(10) Patent No.: US 9,306,794 B2
(45) Date of Patent: Apr. 5, 2016

(54) ALGORITHM FOR LONG-LIVED LARGE FLOW IDENTIFICATION

(71) Applicant: Brocade Communications Systems, Inc., San Jose, CA (US)

(72) Inventors: Ram Kirshnan, Cupertino, CA (US); John Terry, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 414 days.

(21) Appl. No.: 13/797,169

(22) Filed: Mar. 12, 2013

(65) Prior Publication Data

US 2014/0126393 A1  May 8, 2014

Related U.S. Application Data

(60) Provisional application No. 61/721,971, filed on Nov. 2, 2012.

(51) Int. Cl.

| H04L 12/26 | (2006.01) |
|---|---|
| G06F 15/16 | (2006.01) |
| G06F 15/173 | (2006.01) |
| H04L 29/06 | (2006.01) |
| H04L 12/801 | (2013.01) |
| G06F 17/30 | (2006.01) |
| H04L 12/54 | (2013.01) |
| H04L 12/701 | (2013.01) |

(52) U.S. Cl.
CPC .......... *H04L 29/06* (2013.01); *G06F 17/30949* (2013.01); *H04L 43/026* (2013.01); *H04L 43/062* (2013.01); *H04L 47/10* (2013.01); *H04L 12/5695* (2013.01); *H04L 45/00* (2013.01)

(58) Field of Classification Search
CPC ............................ H04L 43/062; H04L 43/026
USPC .......... 709/223, 232, 238; 711/216; 713/201; 704/10; 370/230, 235, 392
See application file for complete search history.

(56) References Cited

U.S. PATENT DOCUMENTS

| 7,430,203 | B2 | 9/2008 | Millet et al. |
|---|---|---|---|
| 7,733,805 | B2 | 6/2010 | Kanda et al. |
| 2003/0012139 | A1 | 1/2003 | Fukumoto et al. |
| 2003/0179705 | A1 | 9/2003 | Kojima |
| 2004/0004961 | A1 | 1/2004 | Lakshmanamurthy et al. |
| 2004/0024894 | A1* | 2/2004 | Osman et al. ............. 709/230 |
| 2004/0064737 | A1* | 4/2004 | Milliken et al. ........... 713/201 |

(Continued)

OTHER PUBLICATIONS

Cristian Estan, et al., "New Directions in Traffic Measurement and Accounting", 2002, pp. 323-336.

*Primary Examiner* — Alpus H Hsu
*Assistant Examiner* — Camquyen Thai
(74) *Attorney, Agent, or Firm* — Blank Rome, LLP

(57) ABSTRACT

A mechanism for identifying long-lived large flows in a communication network is disclosed in which packets transmitted through ports of a switching device or router are continuously examined. As new flows are recognized, their flow definition information is processed through a hashing table that uses a predetermined number of hash stages each having a preselected number of hash buckets. Each hash bucket has a counter that is incremented each time flow definition information ends up in the bucket. At the same time as counters are incremented, they are compared against a threshold number. If the bucket counters for all the hash stages exceed this threshold number, the flow is identified as a long-lived large flow and stored as such in a flow table.

21 Claims, 4 Drawing Sheets

(56) References Cited

U.S. PATENT DOCUMENTS

| | | |
|---|---|---|
| 2004/0117600 A1* | 6/2004 | Bodas et al. .................. 712/210 |
| 2005/0213501 A1 | 9/2005 | Fontana et al. |
| 2005/0270976 A1 | 12/2005 | Yang et al. |
| 2006/0133376 A1 | 6/2006 | Valdevit |
| 2006/0146708 A1 | 7/2006 | Kanazawa |
| 2007/0140122 A1* | 6/2007 | Murthy ......................... 370/231 |
| 2007/0230492 A1 | 10/2007 | Ugai et al. |
| 2008/0222386 A1* | 9/2008 | Chiang et al. ................. 711/216 |
| 2009/0010259 A1 | 1/2009 | Sirotkin |
| 2009/0089048 A1* | 4/2009 | Pouzin ............................ 704/10 |
| 2009/0193105 A1* | 7/2009 | Charny et al. ................. 709/223 |
| 2010/0202319 A1 | 8/2010 | Kanda et al. |
| 2011/0225391 A1* | 9/2011 | Burroughs et al. ........... 711/216 |

\* cited by examiner

__US 9,306,794 B2__

ALGORITHM FOR LONG-LIVED LARGE FLOW IDENTIFICATION

RELATED APPLICATIONS

This application is a non-provisional application of Ser. No. 61/721,971, titled "Optimal Hardware Algorithm For Long-Lived Large Flow Identification In Switches And Routers," filed Nov. 2, 2012, which is incorporated herein by reference.

TECHNICAL FIELD

The present invention relates to the field of computer networking, and in particular to improved techniques for monitoring and management of long-lived large flows.

BACKGROUND

A frame may pass from a source address to a destination address in a communications network, subject to imposed constraints such as zoning restrictions in a Fibre Channel (FC) network. Travel between such a pair of communicating endpoint network addresses is known as a frame flow (a "flow"). Communications networks typically handle a large number of flows. Generally, such flows travel within a communications network from a source device to a destination device through one or more switching devices. Different frame flows have a variety of different duration and flow sizes. While most flows are short-lived, a majority of frames belong to long-lived flows. Many of the long-lived flows are also large flows.

Long-lived large flows generally create more traffic across a network than other flows. Therefore, identifying long-lived large flows and their activity levels is desirable to detect traffic congestion causes to route around congestion. Identifying such flows is also useful for backup transactions, virtual machine migration operations, long-form video contents, load balancing, preventing denial of service attaches, and reporting to a network administrator. U.S. Pat. No. 7,733,805, titled "Method and Apparatus for Determining Bandwidth-consuming Frame Flows in a Network," which is incorporated herein by reference, discusses a method for identifying long-lived flows in a Fibre Channel network. While this method works for FC networks, it is not easily scalable to Ethernet and IP networks due to a significant increase in the number of flows that are typically present in an IP or Ethernet network.

Monitoring frame flows to identify long-lived large flows is not an easy task, because merely knowing the endpoints and the various ports involved is not sufficient, as the actual data transfer levels must also be measured. While this may be simple in theory, in an actual network, particularly an IP network, the sheer number of frame flows renders the task difficult. Moreover, concurrently monitoring and maintaining a flow traffic record of all flows presents a substantial resource obstacle. Additionally, methods used for identifying long-lived large frames generally result in a high percentage of false positive identification of short-lived small flows as long-lived large flows.

Therefore, what is desirable is a novel process and system that efficiently identifies long-lived large flows in a variety of communication networks while minimizing false positive identification of short-lived small flows as long-lived large flows.

SUMMARY

Implementations described and claimed herein address the foregoing problems by continuously examining packets transmitted through egress and ingress ports of a switching device or router and over an interswitch link connected to the egress and ingress ports to identify long-lived large flows. As flows that have not already been declared as a long-lived large flow are recognized, their flow definition information is processed through a hashing table that uses a predetermined number of hash stages each having a pre-selected number of hash buckets. Each hash bucket has a counter that is incremented each time flow definition information ends up in the bucket. At the same time as counters are incremented, they are compared against a threshold number. If the bucket counters for the particular flow for all the hash stages exceed this threshold number, the flow is identified as a long-lived large flow and stored as such in a flow table.

BRIEF DESCRIPTIONS OF THE DRAWINGS

DETAILED DESCRIPTIONS

Figure 1:
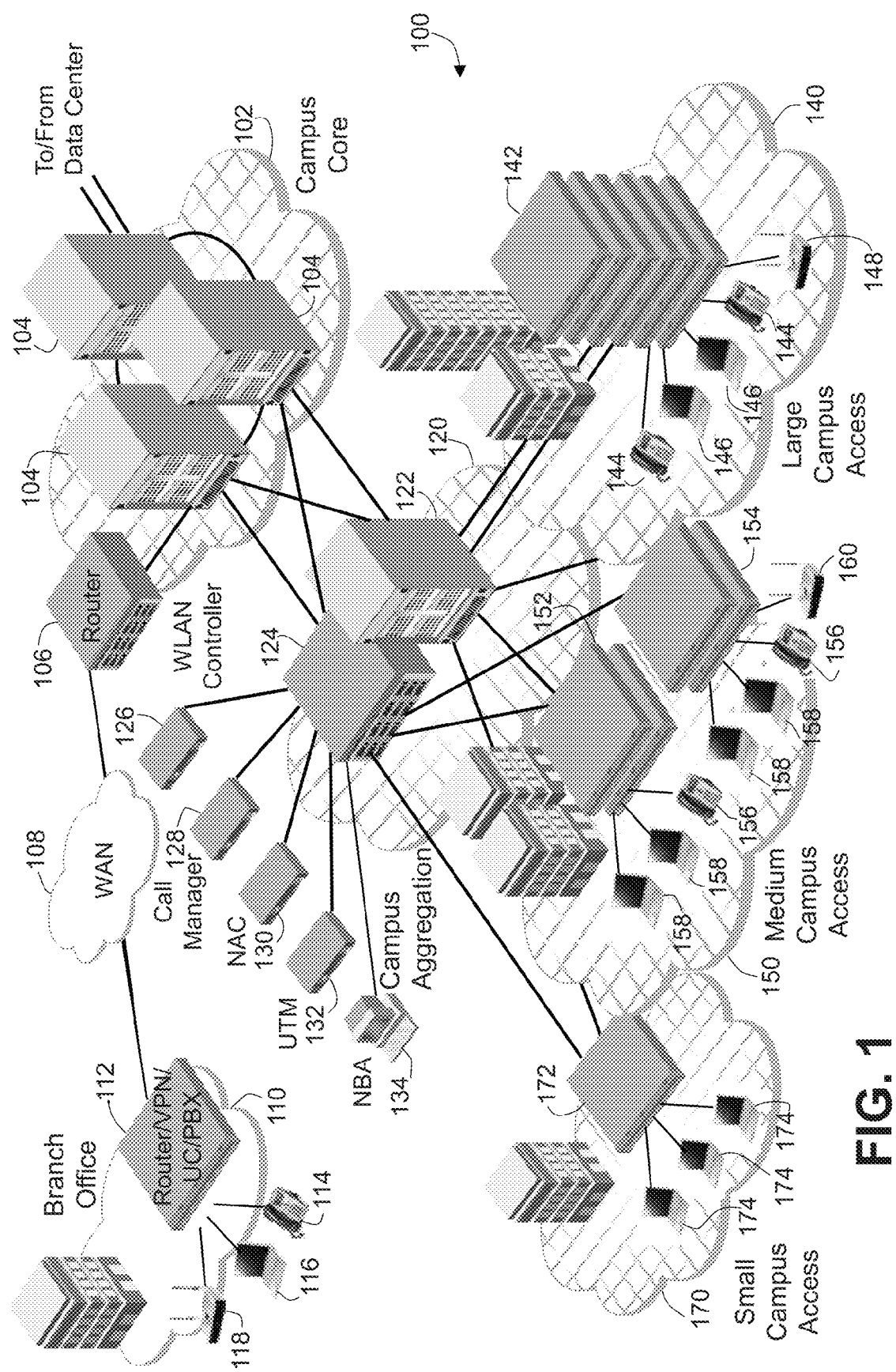
FIG. 1 illustrates a block diagram of a prior art enterprise network architecture and devices.

A system and method for identifying long-lived large flows in a communications network is described. FIG. 1 illustrates a general network architecture 100 for an enterprise with branch offices and various campuses. A campus core network 102 includes a plurality of interconnected core switches 104. The core switches 104 are connected to a data center (not shown). A router 106 is connected to the core switches 104. The router 106 connects through a wide area network (WAN) 108 to a branch office network no. The branch office network no includes a unified device 112 which operates as a router, virtual private network interface, unified communication interface, switch and PBX. Therefore telephones 114, computers 116 and wireless access points 118 are connected to the unified device 112. A campus aggregation network 120 is connected to the campus core network 102. The campus aggregation network 120 includes switches 122 and 124. The switches 122 and 124 are connected to the core network switches 104. Connected to the switch 124 in FIG. 1 is a WLAN controller 126, a call manager 128, a network access controller 130, a unified threat management (UTM) device 132 and a network behavioral analysis (NBA) device 134. These are the various dedicated appliances for the relative type of traffic. For example, the WLAN controller 126 is used to manage wireless access control into the network, the call manager 128 handles unified communications, and the UTM 132 handles various threats and the like. A large campus access network 140 includes a series of stackable switches 142 which are connected to the switches 122 and 124. Connected to the stackable switches 142 are telephones 144, computers 146 and wireless access points 148. A medium campus access network 150 includes a series of switches 152 and 154 which are connected to the switches 122 and 124. Connected to the switches 152 and 154 are telephones 156, computers 158 and wireless access points 160. A small campus access network 170 includes a switch 172 which is connected to the switches 122 and 124. A series of computers 174 are shown connected to switch 172. This is a typical enterprise network configuration with the various exemplary pieces. It can be seen that to handle the wireless access traffic for the various wireless access points such as 148 and 160, network traffic is transferred through the relevant switches such as 142, 154 and 124 to the WLAN controller 126 for control. The network traffic is then transferred from the WLAN controller 126 back to the switch 124 to the core switches 104. Similarly, unified communications such as call setups have to travel from the telephones 144 or 156 to the call manager 128 through the switches 153, 154, 142 and 124 and then back to the network as required.

The network 100 carries and processes a very large number of flows (e.g., thousands or millions of flows). Monitoring all of the flows that travel through each switch in this network during a specific time period can present an enormous bookkeeping task and consume scarce resources of each switch. The present invention provides an optimal algorithm for monitoring flows in a communications network such as the network 100 to identify long-lived large flows efficiently. The algorithm, in one embodiment of the present invention, is an inline solution which requires minimal hardware resource and has a high degree of scalability. The algorithm also maintains a high line-rate of performance and provides an accounting of long-lived large flows with a high degree of accuracy.

Each switch in the network 100 may perform the flow identification functions. A switch can identify long-lived large frame flows as part of its packet processing of an egress and/or ingress port. To perform the flow identification functions, the switch may include counters and/or flow tables that maintain a record of long-lived large frame flows on each link. It should be understood that two or more switches of the network 100 can concurrently perform the same flow identification operations from their own perspective.

Figure 2:
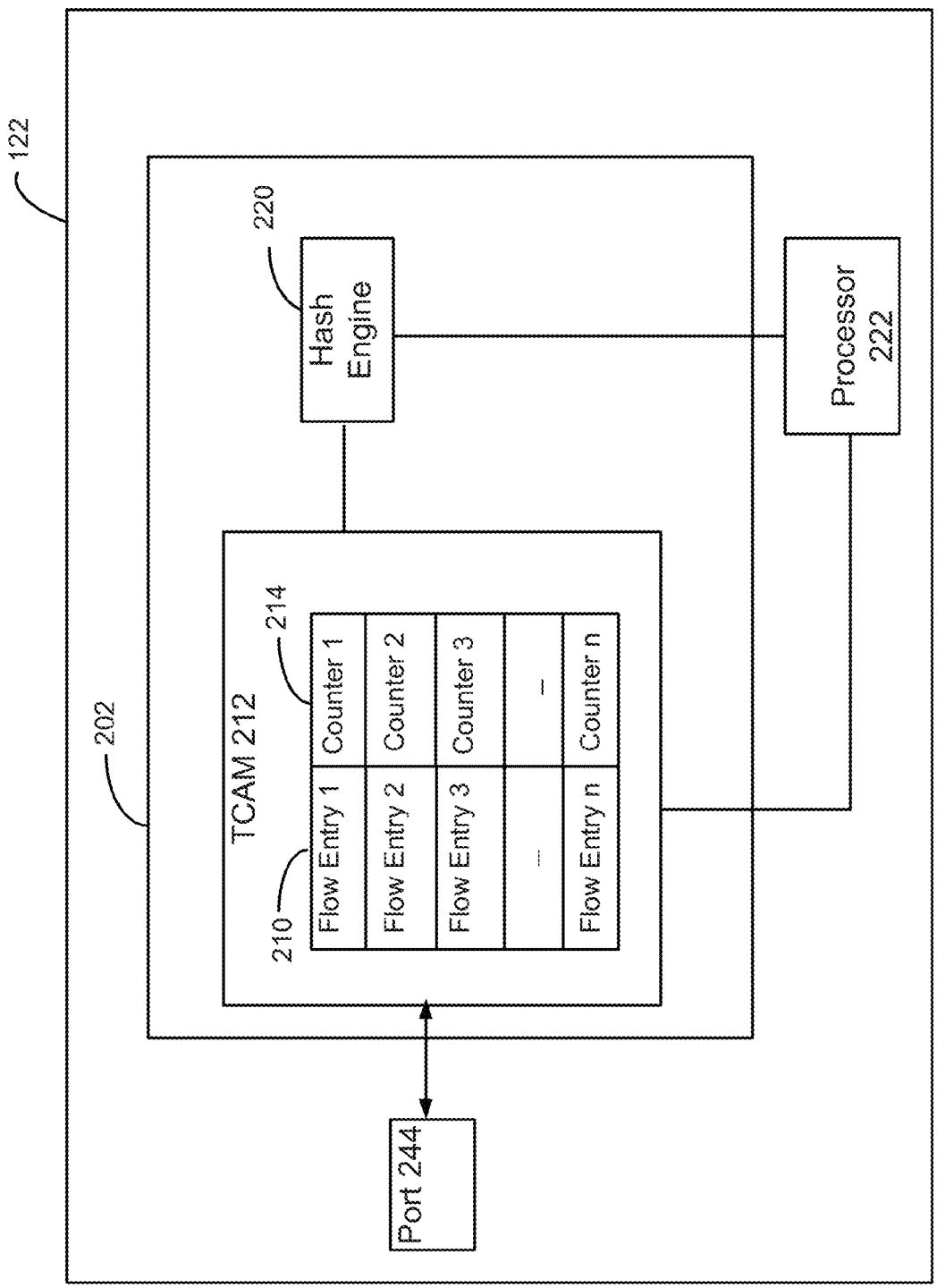
FIG. 2 illustrates an architecture of an example network switching device providing long-lived large flow identification features.

In the preferred embodiment of the present invention each switch in the network 100 includes the algorithm for monitoring traffic to identify long-lived large flows. FIG. 2 illustrates a block diagram of some of the internal components of an exemplary switch in the network, such as switch 122. The switch 122 includes a packet processing circuitry 202 for processing arriving packets. This packet processing circuitry 202 receives the packet from the port 244 and processes the packet header information for various reasons. One important reason is to determine packet routing, but that logic is not shown in FIG. 2, as it is not the focus of the present invention and is omitted for clarity. The header information is also used for statistical purposes, such as counting frames particularly counting frames of flows, which is the focus of the present invention. The counting section uses the packet header information by identifying a flow key in the flow definition information of the packet header and looking up the flow key in a long-lived large flow ternary content-addressable memory (TCAM) 212. The port 244 may be an ingress or egress port.

The flow definition information depends on the type of communication network used and in one embodiment is programmable per port. The flow definition may include information such as MAC source and destination addresses, IP source and destination addresses and TCP source and destination ports. Depending on the type of network, the flow definition may be an IP 5 tuple, IP 3 tuple, MPLS labels, Fiber Channel over Ethernet data transfer parameters, IPv6 labels, or may take other formats. An IP 5 tuple flow definition can include the Protocol (IPv4 or IPv6), source IP, destination IP, TCP/UDP source port, and TCP/UDP destination port. An IP 3 tuple may include the Protocol (IP Protocol), source IP and destination IP.

Each flow definition contains a unique flow key that can be used to identify and distinguish the flow from other flows. The flow key is generally stored in a long-lived large flow table when such a flow is first identified. The flow key is then used to locate the flow's entry in the flow table. When the flow key is not found in the table, it is an indication that this flow has not been yet identified as a long-lived large flow.

In one embodiment, as new long-lived large flows are detected by the packet processing circuitry 202, their flow key is inserted as a flow entry in a flow table 210 stored in the TCAM 212 maintained by the switch 122. TCAMs are well-known devices in which each cell of the memory can take three logic states, namely "0", "1" or "X" (undefined or "don't care"). In alternative embodiments, instead of a TCAM, other hardware table resources, such as other types of content-addressable memory (CAM) are used. Prior art flow identification and management mechanisms generally utilize a flow TCAM for processing and storing information about the flows passing through the switch. As a result these systems need significantly large TCAMs to monitor a large number of flows, both long and short-lived, which is very costly in terms of chip area and transistor counts. Often much of the TCAM ends up monitoring short-lived flows, which are not of interest. Thus, a large chip area is effectively wasted, limiting other functions that could be added. The algorithm of the preferred embodiment of the present invention uses a counting TCAM for keeping track of long-lived large flows which is much smaller in size than a routing flow TCAM.

The TCAM 212 receives flow definition information from the port 244 and uses this flow information to determine whether the flow has already been identified as a long-lived large flow and whether or not it should be counted by one of the counters 214. Each counter of the counters 214 is associated with one of the flow entries in the flow table 210 and is used to keep track of the number of long-lived large flows. The counters 214 include a plurality of hardware counters, each of which is configurable to count a particular frame flow when triggered by the TCAM 212. The processor 222 programs the TCAM 212 for the desired frame flow operations. The hash engine 220 uses the flow definition information from the packet headers of incoming flows as input into various hash buckets that, as discussed below, help identify long-lived large flows. By having a much more transistor and chip area efficient method of determining long-lived flows, the TCAM 212 in the preferred embodiment can be much smaller than in the prior art, allowing additional functions to be added or the cost reduced.

Figure 3:
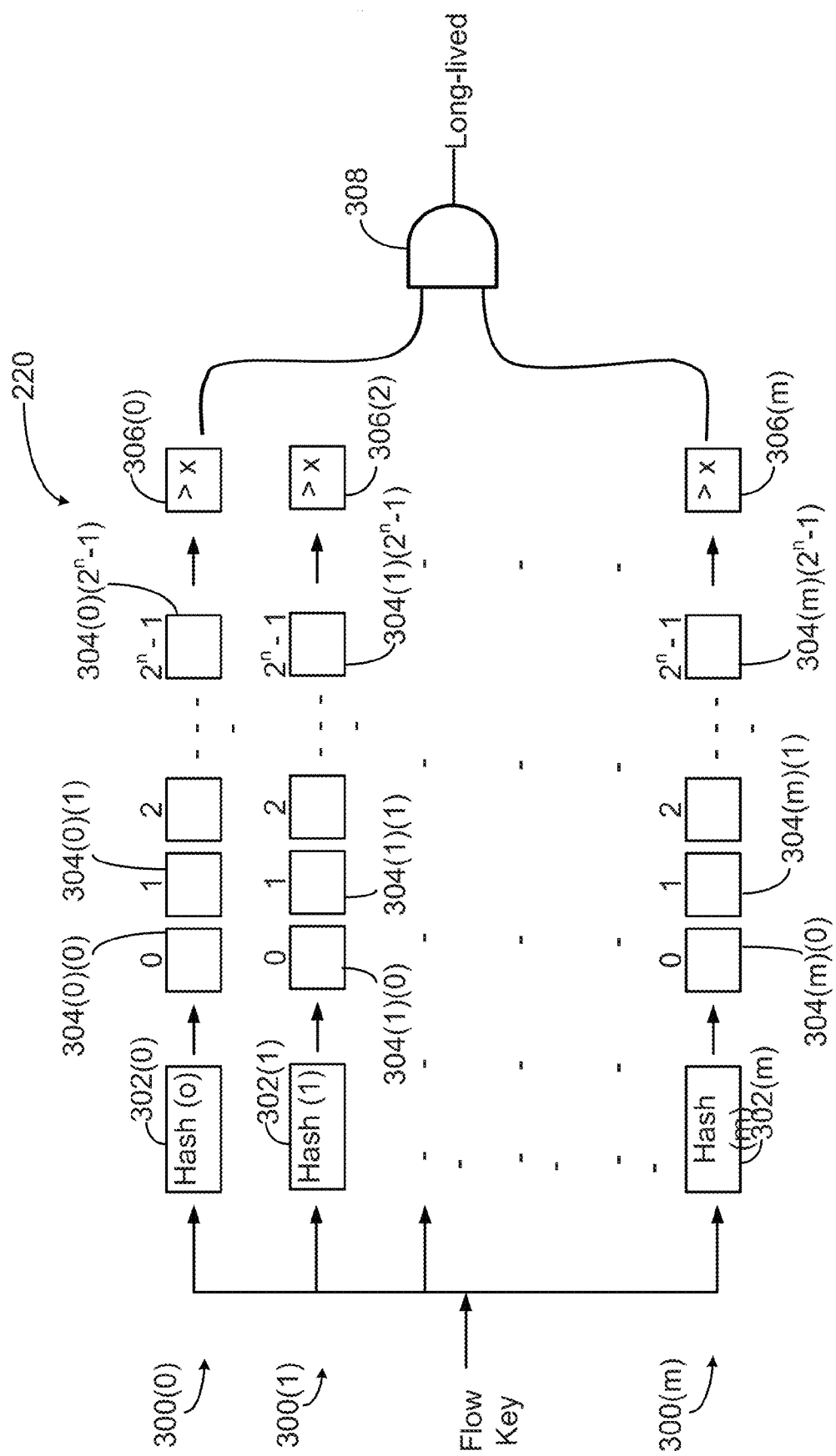
FIG. 3 illustrates a hash table used to identify long-lived large flows according to an embodiment of the present invention.

FIG. 3 illustrates an exemplary hash engine 220 used to identify long-lived large flows. The hash engine 220 includes a predetermined number "m" of hash elements or stages 300. Each of the hash stages 300 has a different hash function 302 and each has an n bit output. The hash functions 302 may include cyclic redundancy check (CRC) functions such as the following:

CRC-12: $x^{12}+x^{11}+x^3+x^2+x+1$

CRC-16-CCITT: $x^{16}+x^{12}+x^5+1$

CRC-32: $x^{32}+x^{26}+x^{23}+x^{22}+x^{16}+x^{12}+x^{11}+x^{10}+x^8+x^7+x^5+x^4+x^2+x+1$

The same flow key is input into each of the hash stages 300 and is examined by each hash stage 300 at the same time. Each hash stage 300 has a pre-selected number $2^n$ of hash buckets 304. These buckets 304 are numbered [0] to [$2^n-1$] for each of the hash stages 300 in FIG. 3. Each of the hash buckets 304 holds a counter (not shown) for keeping track of the number of flows. The operation of this hash engine 220 is discussed in more detail below.

Figure 4:
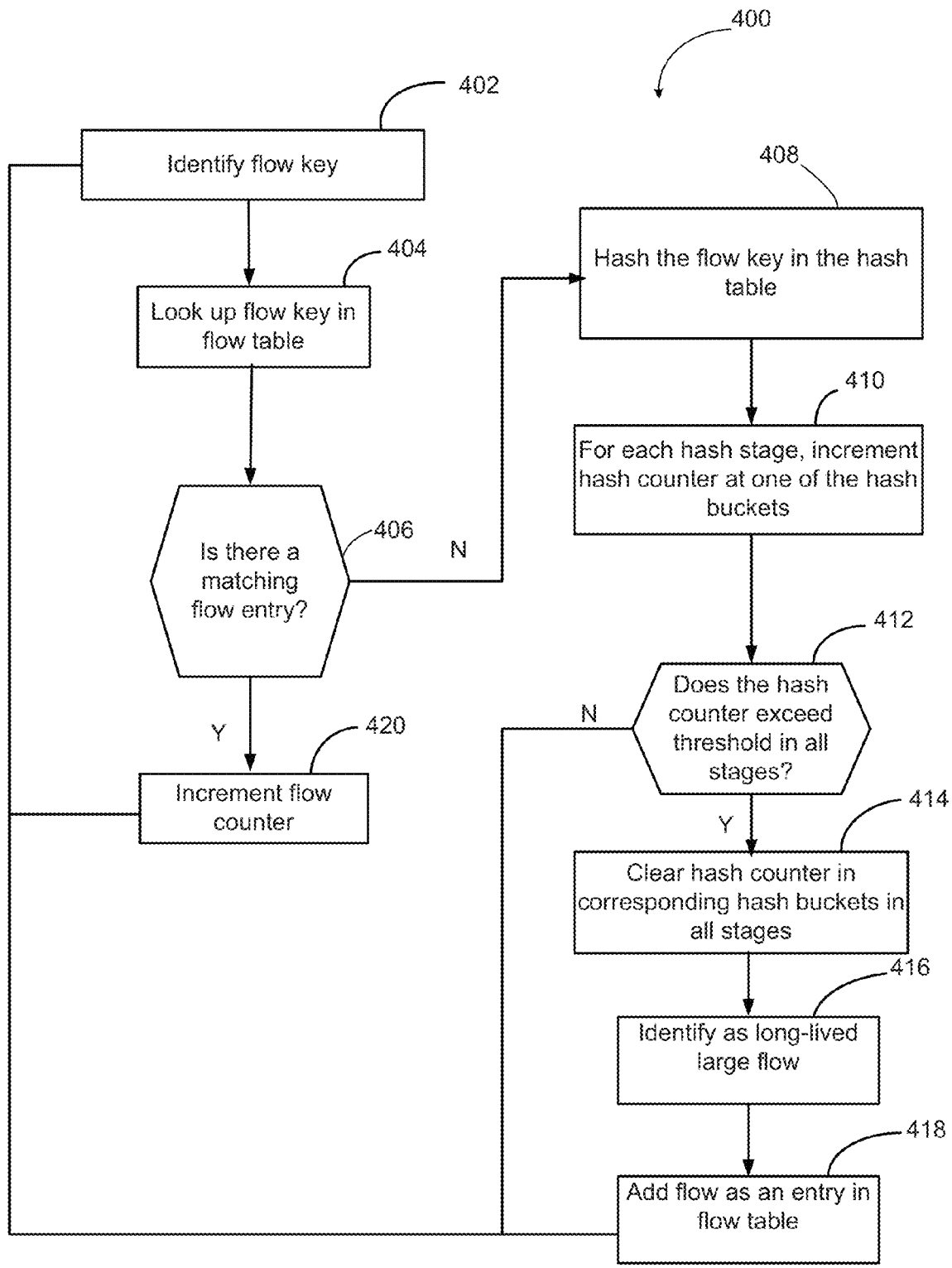
FIG. 4 illustrates flowcharts describing exemplary operations for identifying long-lived large flows.

FIG. 4 demonstrates a flow chart showing the steps performed in identifying long-lived large flows. In the preferred embodiment, the steps of FIG. 4 are performed as part of ingress or egress packet processing in a switch or router. As illustrated in FIG. 4, the first step in the algorithm is to identify a flow key of the flow being processed at the port, at step 402. The flow key is determined per the flow definition information and is a unique identifier for each flow. The identified flow key is then looked up in the flow table 210 of the TCAM 212, at step 404. Then the algorithm determines, at step 406, if the flow key matches one of the flow entries in the flow table 210. The matching of the flow key with one of the flow entries in the table indicates that the flow has already been identified as a long-lived large flow. This results in incrementing one of the counters 214 which is associated with that flow, at step 420, and going back to the first step to identify more flow keys.

If the flow key does not match with any of the flow entries in the flow table 210, then the algorithm proceeds to determine whether or not it belongs to a long-lived large flow. To achieve that, at step 408, the algorithm hashes the flow key in the hash engine 220. This means the flow key is hashed in parallel to all of the "m" hash stages 300 of the hash engine 220. As discussed above, each of the hash stages 300 has a different hash function 302 and each stage 300 has $2^n$ number of hash buckets 304. Because each stage 300 has a different function, the flow key can end up in different hash buckets 304 in each of the hash stages 300. This is indicated, in FIG. 3, by the arrow to the right of the hash function 302. The counter for the hash bucket 304 in which the flow key ends up is then incremented in each hash stage 300, at step 410. At this point in time, the algorithm recognizes which hash bucket 304 of each hash stage 300 holds the flow key as those values are the outputs of the hash logic of each hash stage 300. Thus, the algorithm can look at the counters in the relevant hash buckets 304 to determine whether or not the flow is a long-lived large flow. This is indicated by the arrow to the right of the hash buckets 304 pointing to comparator 306. At step 412, the algorithm compares the value of each of the bucket counters for the relevant buckets to a predetermined threshold number, x, using the comparators 306. If all of the relevant counters (one in each hash stage) exceed that threshold number, as determined by the AND gate 308, the flow is identified as a long-lived large flow. Once the flow is identified as a long-lived large flow, the hash counters in corresponding hash buckets 304 are cleared, at step 416. The flow is then added as a new entry to the flow table 210, at step 418 by the processor 222. If the bucket counters do not exceed the threshold number, the algorithm returns to the beginning to continue monitoring the flow.

Periodically during the process, the counters in all of the hash buckets 304 in each of the hash stages 300 are cleared. This is done in one embodiment by the algorithm calling a hardware function. The time interval between clearing the counters is programmable. In addition to the bucket counters, the algorithm also periodically ages out the entries in the flow table. This includes aging of inactive long-lived large flows and false positive short-lived small flows. This time period is also programmable.

The above discussed algorithm for identifying long-lived large flows is very efficient and has a high degree of accuracy. In one embodiment, the probability of having false positives using the above algorithm by identifying short-lived flows as long-lived large flows when few new long-lived flows are being learnt can be calculated. To calculate this probability, it is assumed that 1) short-lived flows are uniformly distributed over the hash space; 2) in each hash bucket, the short-lived flows follow a normal distribution; and short-lived flows follow the same burst pattern in the interval of examination. Given these assumptions, we can use the following notations and equations to calculate the probability:

Number of hash stages: m
Number of hash buckets per stage: n
Minimum long-lived flow rate (bytes/sec.): s
Time interval of examination (sec.): t
Number of short-lived flows in time interval: x
Number of packets per short-lived flow in time interval: y
Packet size of short-lived flow: z
Number of short-lived flows in the same hash bucket which can cause a false positive=$x_1$
Average number of short lived flows in a hash bucket=$x_2$ (x/n)
$x_1 * y * z \sim = s * t$
$x_1 \sim = (s*t)/(y*z)$; and
Probability per hash stage mean $x_2$: $p_1 = P(x >= x_1)$
Overall probability is $p_1\hat{}m$.

The above equations and notations can be used to calculate an exemplary probability for identifying false positives. Using the above notations, assuming that a long-lived large flow has a number equal to 8K, a time of five minutes and the number of new long-lived flows per second is the following:

New long-lived flows per second=8*1024/300=27.3 and assuming the following numbers:
m=4
n=2K
s=1 MB/sec
t=1 sec
x=200K
y=10
z=1K
then:
$x_2$=200K/2K=100
$x_1$=(1024*1024)/(10*1024)=102.4
$p_1 \sim$0.5 (100 short-lived flows fall into one hash bucket on the average).
The overall probability will be $(p_1)\hat{}m=(0.5)\hat{}4=0.0625$. Thus, using the above exemplary numbers the algorithm results in a 6% of false positive identifications.

The above equations can be used when only a few new long-lived large flows are being identified. In cases where a large number of long-lived large flows are being identified, network topology may change and the equations should also be somewhat changed. In this case, assuming that 1) the flows are uniformly distributed over the hash space; 2) in each hash bucket, the flows follow a normal distribution; 3) the hash buckets are filled with long-lived large flows, and given the following notation:

Number of long-lived flows: l
then the probability per hash stage (number of long-lived large flows is mean $x_1$=l/n, $p_1$=P (x>=1). The overall probability is then equal to $p_1\hat{}m$.

The above equations can be used with the following exemplary numbers to calculate an exemplary probability for this particular situation. If for long-lived large flows the number equals 8K, all 8K long-lived flows are being learnt, and assuming the following numbers:
m=4
n=2K
s=1 MB/sec
l=8K
$p_1 \sim$0.95 (4 long-lived large flows fall into one hash bucket on the average). The overall probability is then approximately equal to $(p1)\hat{}m=(0.95)\hat{}4=0.81$ (81%).

If instead of the 2K hash buckets, the algorithm uses 8K hash buckets (n=8K), the probability drops to the following:

p1~=0.5 (1 long-lived flow falls into one hash bucket on the average).

The overall probability equals to $(0.5)^4=0.0625$ (6%).

In the above calculation, if we use eight number of hash stages instead of four (m=8) and use 8K hash buckets (n=8K), then the probability drops even further to:

p1~=0.5 (1 long-lived flow falls into one hash bucket on the average).

The overall probability then equals to $(0.5)^8=0.004$ (0.4%). Thus, to decrease the probability of false positives, it is preferable to dimension the number of hash buckets per stage (n) as equal to the number of long-lived flows. With this, the number of hash stages (m) at a value of eight (8) dramatically reduces the probability of false positives to below 1%.

In a preferred embodiment of the present invention, for long-lived large flows that are 8K long, the algorithm uses hash tables that are 8 by 8 meaning that they have 8 stages and each stage has 192 or 8K buckets. The hash engine counters are preferably 32 bits and count in 32 byte increments. Alternative numbers of stages and buckets are possible. For example, a hash engine can have 4 stages and 4K buckets, or 4 stages and 8K buckets. The number of stages and buckets can be varied to meet a desired false positive value using the calculations discussed above.

The above discussed algorithm for identifying long-lived large flows provides a quick and efficient method for monitoring and management of long-lived large flows. As a result of taking advantage of counting TCAMs and flow tables for only long-lived flows, this algorithm uses minimal hardware resources. While running, the algorithm allows the network to maintain line-rate performance, and it has a high degree of scalability for IP and Ethernet networks. Additionally, as shown above, the algorithm provides an accounting of long-lived large flows with a high degree of accuracy.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the frill scope of equivalents to which such claims are entitled. In the appended claims, the terms "including" and "in which" are used as the plain-English equivalents of the respective terms "comprising" and "wherein."

What is claimed is:

1. A hash engine for identifying long-lived large flows comprising:
   a plurality of hashing stages for receiving a flow key associated with a flow, wherein each hashing stage includes:
   a hash function that generates an n bit output from the flow key;
   a plurality of hash buckets, wherein each hash bucket includes a counter providing a hash counter value, wherein one of the hash buckets is selected based on the n bit output, wherein n is an integer greater than 1; and
   a comparator coupled to each of the hash buckets such that the comparator compares the hash counter value of the selected hash bucket with a predetermined threshold to determine if the hash counter value of the selected hash bucket exceeds the predetermined threshold; and wherein a logic operation is performed on the result from all comparators of the hashing stages to identify the flow as a long-lived large flow if the hash counter values for all of the selected hash buckets exceed the predetermined threshold.

2. The hash engine of claim 1, wherein the hash counter value of the selected hash bucket is incremented when the hash function maps the flow key to the selected hash bucket.

3. The hash engine of claim 2, wherein the hash counter value of the selected hash bucket is compared by the comparator after being incremented.

4. The hash engine of claim 1, wherein each hashing stage receives and processes the same flow key.

5. The hash engine of claim 1, wherein at least some of hash functions within the hashing stages implement different hash function within each hashing stage performs.

6. The hash engine of claim 1, wherein the number of hash buckets within each hash stage is 2n.

7. A network device comprising:
   an input port for receiving frame flows;
   a packet processing circuitry coupled to the input port for processing the received flows, the packet processing circuitry comprising:
   a memory for storing information related to identified long-lived large flows; and
   a hash engine comprising:
   a plurality of hashing stages for processing a flow key associated with the received flow, wherein each hashing includes:
   a hash function that generates an n bit output based on the flow key;
   a plurality of hash buckets, wherein each bucket includes a counter that provides a hash counter value, wherein at least one of the hash buckets is selected by the n bit output, wherein n is an integer and greater than 1; and
   a comparator coupled to each of the hash buckets such that the comparator compares the hash counter value of the at least one selected hash bucket with a predetermined threshold to determine if the hash counter value of the at least one selected hash bucket exceeds the predetermined threshold; and wherein a logic operation is performed on the result from all comparators of the hashing stages to identify the received flow as a long-lived large flow if the hash counter values for all of the at least one selected hash buckets exceed the predetermined threshold.

8. The network device of claim 7, wherein each the hash counter value of the at least one selected hash bucket is incremented when the hash function maps the flow key to the at least one selected hash bucket.

9. The network device of claim 8, wherein the hash counter value of the at least one selected hash bucket is compared by the comparator after being incremented.

10. The network device of claim 7, wherein the memory includes a flow table for storing flow entries for each identified long-lived large flow.

11. The network device of claim 10, wherein each flow entry has an associated counter.

12. The network device of claim 10, wherein the flow key is sent to the hash engine when the flow table is unable to identify the received flow as the long-lived large flow.

13. The network device of claim 7, wherein each hashing stage receives and processes the same flow key.

14. The network device of claim 7, wherein each hash function of each hashing stage is different.

15. The network device of claim 7, wherein the number of hash buckets within each hash stage is 2n.

16. A method for identifying long-lived large flows comprising:
- receiving a flow key associated with a flow;
- inputting the flow key in a plurality of hashing stages, wherein each hashing stage performs a hash function to generate an n bit output using the flow key;
- for each hashing stage, selecting a hash bucket from a plurality of hash buckets based on the n bit output, wherein each hash bucket includes a counter that provides a hash counter value, wherein n is an integer and greater than 1;
- for each hashing stage, comparing the hash counter value of the selected hash bucket with a predetermined threshold to determine if the hash counter value of the selected hash bucket exceeds the predetermined threshold; and
- identifying the flow as a long-lived large flow if the hash counter values of all of the selected hash buckets exceed the predetermined threshold.

17. The method of claim 16, further comprising incrementing each hash counter value of the selected hash bucket when the hash function maps the flow key to the selected hash bucket.

18. The method of claim 17, wherein the hash counter value of the selected hash bucket is compared after being incremented.

19. The method of claim 16, wherein each hashing stage receives and processes the same flow key.

20. The method of claim 16, wherein each hashing stage performs a different hash function.

21. The method of claim 16, wherein the number of hash buckets within each hash stage is 2n.

* * * * *